(12) United States Patent
Wada et al.

(10) Patent No.: US 11,543,079 B2
(45) Date of Patent: Jan. 3, 2023

(54) PRESSURE VESSEL

(71) Applicants: THE JAPAN STEEL WORKS, LTD., Tokyo (JP); TOKYO DENKI UNIVERSITY, Tokyo (JP)

(72) Inventors: Yoru Wada, Muroran (JP); Takafumi Hosoya, Muroran (JP); Hirokazu Tsuji, Tokyo (JP)

(73) Assignees: JAPAN STEEL WORKS M&E, INC., Muroran (JP); TOKYO DENKI UNIVERSITY, Tokyo (JP)

( * ) Notice: Subject to any disclaimer, the term of this patent is extended or adjusted under 35 U.S.C. 154(b) by 313 days.

(21) Appl. No.: 16/759,148

(22) PCT Filed: Oct. 26, 2018

(86) PCT No.: PCT/JP2018/040001
§ 371 (c)(1),
(2) Date: Jun. 10, 2020

(87) PCT Pub. No.: WO2019/083047
PCT Pub. Date: May 2, 2019

(65) Prior Publication Data
US 2020/0340625 A1 Oct. 29, 2020

(30) Foreign Application Priority Data
Oct. 27, 2017 (JP) .............................. JP2017-208590

(51) Int. Cl.
*F17C 13/00* (2006.01)
*F17C 5/06* (2006.01)

(52) U.S. Cl.
CPC .............. *F17C 13/002* (2013.01); *F17C 5/06* (2013.01); *F17C 2201/0104* (2013.01);
(Continued)

(58) Field of Classification Search
CPC ................... F17C 13/002; F17C 13/00; F17C 2201/0104; F17C 2203/011; F17C 2203/12; F17C 2223/036
See application file for complete search history.

(56) References Cited

U.S. PATENT DOCUMENTS

| 5,758,796 A | * | 6/1998 | Nishimura | ................ F17C 1/06 220/651 |
| 2013/0049256 A1 | * | 2/2013 | Tani | .......................... F17C 1/06 264/249 |

(Continued)

FOREIGN PATENT DOCUMENTS

| CN | 1148679 A | 4/1997 |
| CN | 102906484 A | 1/2013 |

(Continued)

OTHER PUBLICATIONS

Communication dated Jun. 28, 2021 issued by the European Patent Office in application No. 18870904.2.
(Continued)

*Primary Examiner* — Javier A Pagan
(74) *Attorney, Agent, or Firm* — Sughrue Mion, PLLC (57) ABSTRACT

A pressure vessel (10) is provided with: a cylinder part (1) that defines a pressure chamber (11); a screwing part (3) that is disposed inside at least one of the two ends of the cylinder part; a lid (2) that has a pressure-receiving surface (2A) facing the pressure chamber and that is disposed at a position closer to the pressure chamber than is the screwing part; and a reinforcing ring (4) that is fitted to the outer circumferential surface of the cylinder part. The reinforcing ring covers, along the axial direction of the cylinder part, a part on an outer circumferential surface (1F) corresponding to a portion or the entirety of the engaging portion (12) between the cylinder part and the screwing part.

13 Claims, 6 Drawing Sheets

(52) U.S. Cl.
CPC ... *F17C 2203/011* (2013.01); *F17C 2209/228* (2013.01); *F17C 2221/012* (2013.01); *F17C 2223/036* (2013.01)

(56) References Cited

U.S. PATENT DOCUMENTS

| | | | | |
|---|---|---|---|---|
| 2015/0362130 | A1* | 12/2015 | Lanzl | H01M 8/04104 429/446 |
| 2019/0049069 | A1* | 2/2019 | Wada | F17C 13/06 |

FOREIGN PATENT DOCUMENTS

| | | | | |
|---|---|---|---|---|
| JP | 62-183199 | U | | 11/1987 |
| JP | 62183199 | | * | 11/1987 |
| JP | 63176897 | A | | 7/1988 |
| JP | 63145058 | U | | 9/1988 |
| JP | 10332083 | A | | 12/1998 |
| JP | 3172853 | U | | 1/2012 |
| JP | 2015-158243 | A | | 9/2015 |
| JP | 2015158243 | A | * | 9/2015 |
| JP | 2017-141919 | A | | 8/2017 |
| JP | 2017141919 | A | * | 8/2017 ................ F16B 5/02 |

OTHER PUBLICATIONS

International Search Report dated Dec. 18, 2018 issued by the International Searching Authority in counterpart International Application No. PCT/JP2018/040001 (PCT/ISA/210).

International Written Opinion dated Dec. 18, 2018 issued by the International Searching Authority in counterpart International Application No. PCT/JP2018/040001 (PCT/ISA/237).

John F. Harvey, "Pressure Component Construction design and materials application", Van Nostrand Reinhold Company, 1980, pp. 382-384, 3 pages total.

"Construction of pressure vessel—General principles", JIS B 8265 : 2010, Japanese Standard Association, Jan. 23, 2012, 12 pages total.

"Construction of pressure vessel", JIS B 8267 : 2008, Japanese Standard Association, Jan. 23, 2012, 14 pages total.

"Standard Concerning Ultrahigh-Pressure Gas Equipment", KHKS 0220 (2010), High Pressure Gas Safety Institute of Japan, 2010, 8 pages total.

Communication dated Nov. 8, 2021 issued by the Korean Intellectual Property Office in application No. 10-2020-7015060.

Communication dated Mar. 31, 2021 issued by the State Intellectual Property Office of P R. China in counterpart Chinese Application No. 201880076413.4.

Information offer in Japanese Patent application No. 2017-208590 dated Jan. 12, 2021.

Sixth publication of Technical materials for polyethylene two-layer water pipes Publication date: Heisei 28(Mar. 1, 2016) URL:http://www.jppe.org/2016/05/17/20160425_technicaldata.pdf, pp. 1-8.

Miyamoto, N., "Stress/Wall Thickness Calculation of Cylindrical Shell (Pipe) Subjected to Internal Pressure", Publication date: Heisei (Aug. 2013) URL:https://calfood-tecsheet.ssl.lilipop.jp/se07tm011.pdf; https://ameblo.jp/tecsheet1/(Technical Sheet (TS); https://catfood-tecsheet.ssl.lolipop.jp/ts-list.pdf.pdf 3 pages.

JIS Handbook 48 Boilers/Pressure Vessels Manufacturing and Parts Edition 1994 Publication date: Heisei (Nov. 20, 1993), 7 pages.

* cited by examiner

| POSITION OF END PORTION 4A | PRIMARY PRINCIPAL STRESS [MPa] | | |
|---|---|---|---|
| | INTERNAL PRESSURE 82MPa | INTERNAL PRESSURE 50MPa | STRESS RANGE |
| −0.64L | 462 | 282 | 180 |
| −0.33L | 462 | 282 | 180 |
| −0.02L | 465 | 284 | 181 |
| 0.29L | 476 | 290 | 186 |

| POSITION OF END PORTION 4B | PRIMARY PRINCIPAL STRESS [MPa] | | |
|---|---|---|---|
| | INTERNAL PRESSURE 82MPa | INTERNAL PRESSURE 50MPa | STRESS RANGE |
| 1.53L | 476 | 290 | 186 |
| 2.15L | 470 | 287 | 183 |
| 2.46L | 462 | 282 | 180 |
| 2.77L | 450 | 274 | 176 |
| 3.39L | 450 | 274 | 176 |

PRESSURE VESSEL

TECHNICAL FIELD

The present invention relates to a pressure vessel including an accumulator chamber capable of storing hydrogen gas or the like.

BACKGROUND ART

Examples of a device for storing high-pressure gas include a pressure vessel for storing and transporting high-pressure hydrogen gas used at a hydrogen station or the like. Conventionally, the pressure vessel is manufactured using high-strength low-alloy steel such as Cr—Mo steel. However, in a case where hydrogen is stored in the pressure vessel, when the pressure vessel has a structure in which hydrogen comes into direct contact with a screwable portion constituting an opening portion of the pressure vessel, there is a concern that strength and ductility of a stress concentrated portion (for example, a screw-threaded portion between a male thread and a female thread) in the screwable portion may decrease due to so-called hydrogen environment embrittlement. Such embrittlement of the pressure vessel is not preferable because it may cause a reduction in an accumulation performance of the pressure vessel.

Therefore, in one of the conventional pressure vessels, a structure (a so-called screwable nut type lid structure) is adopted in which a lid-like structure is interposed between a screwable portion and an accumulator chamber, so that the screwable portion and hydrogen do not come into direct contact with each other. With this structure, the conventional pressure vessel suppresses hydrogen environment embrittlement at a screw-threaded portion (for example, roots of threads) between a male thread and a female thread of the screwable portion (see, for example, NPL 1).

CITATION LIST

Non Patent Literature

NPL 1: John F. Harvey, "Pressure Component Construction Design and Materials Application," VAN NORSTAN-DREINHOLD COMPANY, (1980) P. 382-P.384
NPL 2: JIS B 8265: 2010
NPL 3: JIS B 8267: 2008
NPL 4: "Standard for Ultra High-Pressure Gas Equipment KHKS (0220) 2010," 2010, P. 26 Published by the High Pressure Gas Safety Institute of Japan

SUMMARY OF INVENTION

Technical Problem

In the above-described screwable nut type lid structure, the lid-like structure is normally held at a predetermined position by the screwable portion. In other words, a force exerted on the lid-like structure by gas in the accumulator chamber is transmitted to the screwable portion via the lid-like structure, and finally acts on the screw-threaded portion of the screwable portion. Therefore, in addition to the hydrogen environment embrittlement, there is a concern that a fatigue crack may occur in the screw-threaded portion due to a stress generated in the screw-threaded portion of the screwable portion (particularly, in the vicinity of a first screw thread closest to the accumulator chamber).

From the background as described above, it is desirable for the pressure vessel to suppress both hydrogen environment embrittlement of the screwable portion in the case of storing hydrogen in the accumulator chamber and fatigue crack of the screwable portion due to an internal pressure of the accumulator chamber.

An object of the present invention is to provide a pressure vessel capable of suppressing both hydrogen environment embrittlement and fatigue crack of a screwable portion included in a pressure vessel.

Solution to Problem

In a first aspect of the present invention, a pressure vessel comprising: a cylinder portion defining an accumulator chamber therein; a screwable portion arranged inside at least one of both end portions of the cylinder portion, an outer peripheral portion of the screwable portion being screw-threaded into an inner peripheral portion of the cylinder portion; a lid portion arranged at a position closer to the accumulator chamber than the screwable portion and comprising a pressure receiving surface facing the accumulator chamber; and a reinforcing ring fitted to an outer peripheral surface of the cylinder portion and covering a portion of the outer peripheral surface corresponding to a part or the whole of a screw-threaded portion of the cylinder portion and the screwable portion along an axial direction of the cylinder portion.

According to the first aspect, since the lid portion is provided between the screwable portion and the accumulator chamber, hydrogen is suppressed from coming into direct contact with the screwable portion even when hydrogen is stored in the accumulator chamber. Further, the reinforcing ring provided so as to cover the outer peripheral surface of the cylinder portion (in other words, so as to be fitted to the outer peripheral surface) covers the outer peripheral surface of the cylinder portion corresponding to a part or the whole of the screw-threaded portion between the screwable portion and the cylinder portion. According to experiments and considerations made by the inventors, it becomes clear that the occurrence of a fatigue crack in the screw-threaded portion can be suppressed by arranging the reinforcing ring at such a position (see FIG. 4 or the like). Therefore, the pressure vessel according to the first aspect can suppress both hydrogen environment embrittlement and fatigue crack of the screwable portion.

In a second aspect of the present invention, the pressure vessel according to the first aspect 1, further comprising: a seal portion sealing a gap between the lid portion and the cylinder portion, wherein the reinforcing ring is configured such that an end portion of the reinforcing ring on an accumulator chamber side in the axial direction is positioned at a position on the outer peripheral surface corresponding to the seal portion, or at a position closer to the accumulator chamber side in the axial direction than the position on the outer peripheral surface corresponding to the seal portion.

According to the second aspect, the seal portion further appropriately suppresses gas in the accumulator chamber from coming into contact with the screwable portion. Further, the "end portion on the accumulator chamber side" of the reinforcing ring is positioned at a position on the outer peripheral surface of the cylinder portion corresponding to the sea portion, or at a position closer to the accumulator chamber side than the position on the outer peripheral surface of the cylinder portion corresponding to the seal portion. According to the experiments and considerations made by the inventors, it becomes clear that since the end portion of the reinforcing ring is arranged at such a position, the reinforcing ring can suppress the cylinder portion from deforming so as to expand in the radial direction, and the seal portion can seal the gap more reliably (see FIGS. 6(a) and 6(b)). Therefore, the pressure vessel according to the second aspect can further reliably suppress the hydrogen environment embrittlement of the screwable portion.

In a third aspect of the present invention, the pressure vessel according to the first or second aspect, wherein the reinforcing ring is configured such that an end portion of the reinforcing ring on an opposite side to the accumulator chamber in the axial direction is positioned at a position on the outer peripheral surface corresponding to an end portion of the screw-threaded portion on an opposite side to the accumulator chamber, or at a position farther away from the accumulator chamber in the axial direction than the position on the outer peripheral surface corresponding to the end portion of the screw-threaded portion on the opposite side to the accumulator chamber.

According to the third aspect, the "end portion on the opposite side to the accumulator chamber" of the reinforcing ring is positioned at a position corresponding to the end portion of the screw-threaded portion or positioned farther away from the accumulator chamber than the position corresponding to the end portion of the screw-threaded portion. According to the experiments and considerations made by the inventors, it becomes clear that the occurrence of the fatigue crack in the screw-threaded portion can be suppressed by arranging the reinforcing ring at such a position (see FIGS. 7(a) and 7(b)). Therefore, the pressure vessel according to the third aspect can further reliably suppress the fatigue crack of the screwable portion.

In a fourth aspect of the present invention, the pressure vessel according to any one of the first to third aspects, wherein a difference between the maximum value and the minimum value of a stress generated in the screw-threaded portion is 300 MPa or less in a case where a pressure in the accumulator chamber varies within a range of 82 MPa or less and 50 MPa or more.

According to the fourth aspect, based on the experiments and considerations made by the inventors, it became clear that the difference (hereinafter referred to as a "stress range") between the maximum value and the minimum value of the stress generated in the screw-threaded portion can be reduced since the reinforcing ring is attached to the cylinder portion (see FIGS. 6(a), 6(b), 7(a) and 7(b)). In particular, if the stress range is 300 MPa or smaller in a case where the pressure in the accumulator chamber varies within the range of 82 MPa to 50 MPa, the pressure vessel of the present invention can be used even when the accumulator chamber has a particularly high pressure such as a hydrogen storage vessel at a hydrogen station. In particular, if the cylinder portion is designed using a thin-walled pipe satisfying the above condition and having a safety coefficient of 2.4 or more, it is possible to contribute to reduction in a size of the hydrogen storage vessel at the hydrogen station. Incidentally, in this case, the "safety coefficient" is a value calculated by "the tensile strength of a steel material or the like forming the thin-walled pipe and/or the maximum stress assumed in design of the thin-walled pipe" (see, for example, NPLs 2 to 4).

In a fifth aspect of the present invention, the pressure vessel according to any one of the first to fourth aspects, wherein the reinforcing ring is fitted to the cylinder portion in a state of exerting a compressive stress so as to tighten the cylinder portion.

According to the fifth aspect, since the cylinder portion is tightened by the reinforcing ring, the effect of protecting the seal portion and the screw-threaded portion is enhanced, and the hydrogen environment embrittlement and the fatigue crack can be more reliably suppressed. For example, the tightening can be realized by shrink-fitting the reinforcing ring to the cylinder portion.

In a sixth aspect of the present invention, the pressure vessel according to any one of the first to fifth aspects, wherein a thickness of the reinforcing ring in a radial direction of the cylinder portion is 5% or more and 10% or less of an outer diameter of the cylinder portion.

According to the sixth aspect, based on the experiment and the considerations conducted by the inventors for the sixth aspect, it becomes clear that the reinforcing ring having such a thickness can achieve both effect of protecting the seal portion and the screw-threaded portion and an economic efficiency and weight of the pressure vessel as a product.

In a seventh aspect of the present invention, the pressure vessel according to any one of the first to sixth aspects, wherein the lid portion comprises an extending portion expanding radially outward of the cylinder portion, wherein the screwable portion comprises a recessed portion recessed radially outward, wherein the extending portion and the recessed portion abut against each other in the axial direction, and wherein an outer peripheral edge of the screwable portion on the accumulator chamber side and the lid portion are separated from each other in the axial direction.

According to the seventh aspect, since the outer peripheral edge (in other words, in the vicinity of the screw-threaded portion) of the screwable portion on the accumulator chamber side is separated from the lid portion, the force exerted on the lid portion by the gas in the accumulator chamber is not easily transmitted directly to the screw-threaded portion. Therefore, the pressure vessel according to the seventh aspect can further reliably suppress the occurrence of the fatigue crack.

In an eighth aspect of the present invention, the pressure vessel according to any one of the first to seventh aspects, wherein the cylinder portion has a straight tubular and cylindrical shape.

According to the eighth aspect, since the cylinder portion has the straight tubular (that is, a tubular shape that is not curved) and cylindrical shape, it is possible to easily perform a precise machining when the cylinder portion is manufactured as compared with a case where the cylinder portion is curved. Therefore, it is possible to suppress the occurrence of a machining crack on the inner wall surface or the like of the cylinder portion, and to suppress occurrence of the hydrogen environment embrittlement in the cylinder portion due to the machining crack. In addition, it is also possible to increase the work efficiency of inspecting the presence or absence of the machining crack.

In an ninth aspect of the present invention, the pressure vessel according to any one of the first to eighth aspects, wherein a fatigue crack life is not less than 400,000 times in a case where an annular crack having a depth of 0.1 mm is assumed as an initial assumed crack in the screw-threaded portion of the cylinder portion, in fatigue crack propagation analysis according to Standard for Ultra High-Pressure Gas Equipment KHKS 0220 (2010) defined by the High Pressure Gas Safety Institute of Japan.

According to the ninth aspect, since the pressure vessel has a fatigue crack life of 400.000 times or more in fatigue crack propagation analysis according to the above standard, the pressure vessel that can withstand long-term practical use can be provided as the hydrogen storage vessel at the hydrogen station. Incidentally, "400,000 times" is a value assuming a case where the pressure vessel is subjected to about 100 times of pressure increase and pressure decrease per day for about 10 years.

Advantageous Effects of Invention

According to the present invention, both hydrogen environment embrittlement of the screwable portion in the case of storing hydrogen in the accumulator chamber and fatigue crack of the screwable portion due to the internal pressure of the accumulator chamber can be suppressed.

DESCRIPTION OF EMBODIMENTS

<Structure of Pressure Vessel>

A pressure vessel 10 according to an embodiment of the present invention will be described below.

Figure 1:
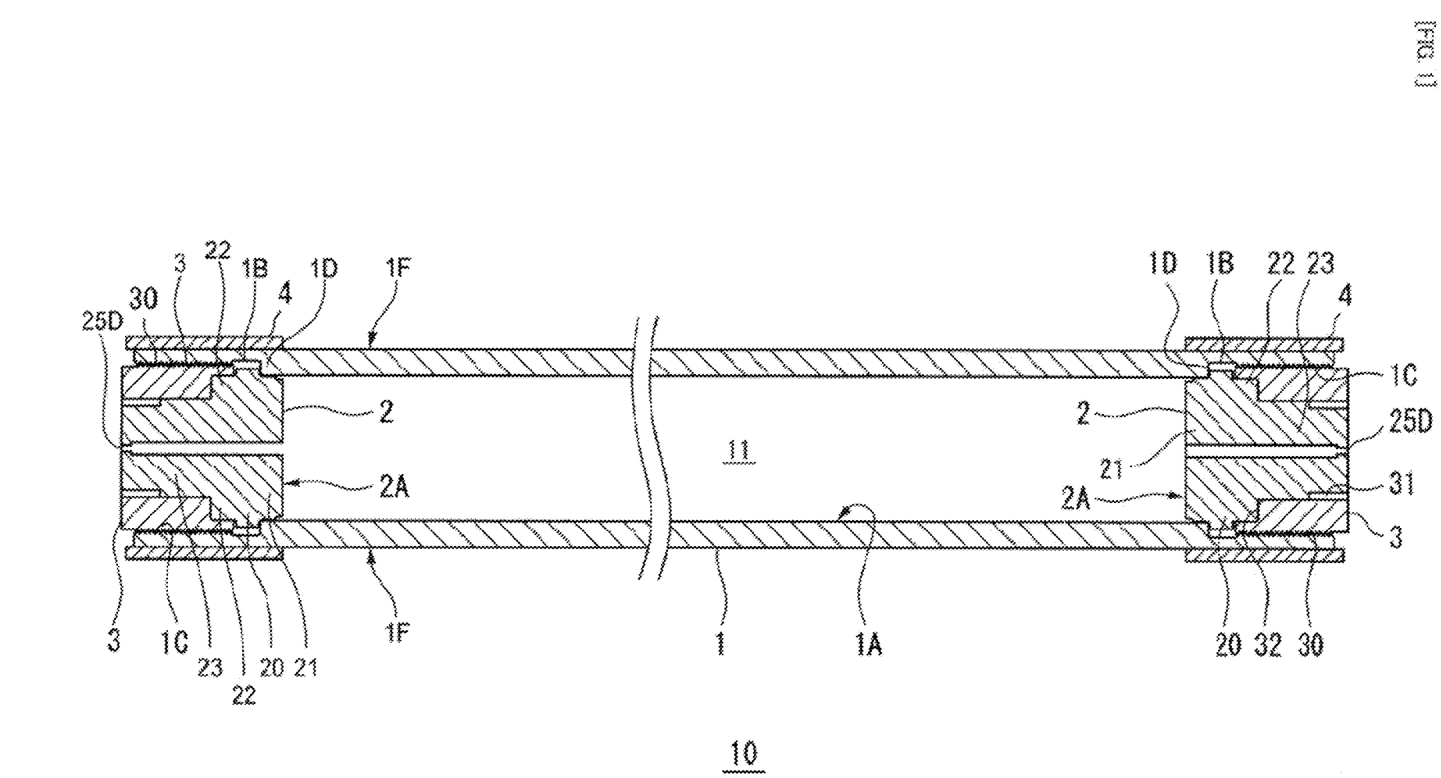
FIG. 1 is a sectional view showing a pressure vessel according to an embodiment of the present invention.

As shown in FIG. 1, the pressure vessel 10 of the present embodiment includes a cylindrical cylinder portion 1 made of steel that defines an accumulator chamber 11 therein, lid portions 2 made of metal that is provided so as to close both end portions of the cylindrical cylinder portion 1 and each have a passage hole 25D, screwable portions 3 made of metal that fix the lid portions 2 to the cylindrical cylinder portion 1, and reinforcing rings 4 made of metal that are fitted to outer peripheral surfaces 1F of both end portions of the cylindrical cylinder portion 1. As will be described later, pressure receiving surfaces 2A of the lid portion 2 facing the accumulator chamber 11 directly receive a pressure of high-pressure gas in the accumulator chamber 11. On the other hand, the screwable portion 3 is isolated from gas in the accumulator chamber 11 by the corresponding lid portion 2. The pressure vessel 10 may be used, for example, for storing hydrogen gas.

The cylindrical cylinder portion 1 has a straight tubular and cylindrical shape with both end portions opened. Therefore, when the cylindrical cylinder portion 1 is manufactured, it is possible to perform a precise machining such as mirror finishing so that a main inner surface 1A of the cylindrical cylinder portion 1 is not damaged or cracked. For example, as will be described later, it is possible to perform a quality management so that a machining crack having a depth of 0.5 mm or greater does not occur on the main inner surface 1A. In addition, it is also easy to inspect a presence or absence of the crack after the cylindrical cylinder portion 1 is manufactured. On the other hand, as the conventional pressure vessel, a seamless vessel (for example, a Mannesmann-type bomb or an Ehrhardt-type bomb) that has a shape in which a tube cross section becomes smaller as it approaches the opening portion generally has a smaller opening portion than the cylindrical cylinder portion 1. Therefore, in the conventional pressure vessel, the same inspection as that of the cylindrical cylinder section 1 is difficult.

Materials of the cylindrical cylinder portion 1, the lid portion 2, the screwable portion 3, and the reinforcing ring 4 are not particularly limited. Manganese steel, chromium molybdenum steel, nickel chromium molybdenum steel or other low-alloy steels (excluding stainless steel) can be used, for example. By using these materials having excellent tensile strength as described above, strength of the pressure vessel 10 can be improved. The lid portion 2, the screwable portion 3, and the reinforcing ring 4 may be made of the same material as the cylindrical cylinder portion 1, or may be made of another material (for example, carbon fiber reinforced plastic or the like). The lid portion 2, the screwable portion 3 and the reinforcing ring 4 may be made of different materials.

A method of manufacturing the cylindrical cylinder portion 1 is not particularly limited. For example, it is preferable that the cylindrical cylinder portion 1 is formed into an integral unit by, for example, forging, extrusion, or the like, which is a machining method with few drawbacks. The main inner surface 1A defines the accumulator chamber 11 and receives the pressure of high-pressure gas. It is preferable that the main inner surface 1A of the cylindrical cylinder portion 1 is mirror finished to be free from a crack. In particular, the main inner surface 1A is preferably mirror-finished so as to be free from a crack having a depth of 0.5 mm or greater in a thickness direction of the cylindrical cylinder portion 1 and a surface length of 1.6 mm or greater in the cylindrical cylinder portion 1. By the mirror finishing, a development or propagation of a crack that would be caused by hydrogen environment embrittlement can be suppressed.

Both end portions in an axial direction of the cylindrical cylinder portion 1 are formed with bore portions 1B that are recessed radially outward from the main inner surface 1A. A female thread portion 1C into which the screwable portion 3 is screw-threaded is provided on an inner peripheral portion of each of the bore portions 1B. However, the female thread portion 1C is not provided in a part of the bore portion 1B on an accumulator chamber 11 side.

The screwable portion 3 includes a male thread portion 30 that has a tubular shape and is screw-threaded into the female thread portion 1C at an outer peripheral portion thereof. The screwable portion 3 is attached to both end portions of the cylindrical cylinder portion 1. In this example, an end portion structure of the cylindrical cylinder portion 1 including the screwable portion 3 is the same at one end and another end of the cylindrical cylinder portion 1. However, the end portion structure of the cylindrical cylinder portion 1 may be different at the one end and the other end of the cylindrical cylinder portion 1.

The lid portion 2 includes a first shaft portion 21 on the accumulator chamber 11 side and a second shaft portion 23 on an opposite side to the accumulator chamber 11. The lid portion 2 includes the passage hole 25D penetrating the first shaft portion 21 and the second shaft portion 23 in the axial direction of the cylindrical cylinder portion 1.

Figure 2:
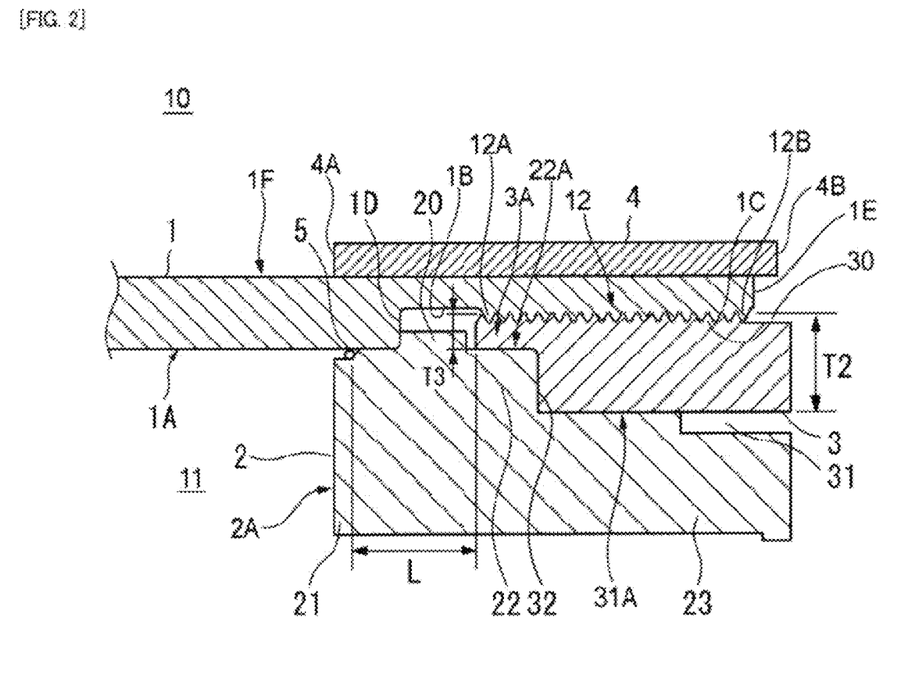
FIG. 2 is an enlarged sectional view showing a part of the pressure vessel shown in FIG. 1.

The first shaft portion 21 of the lid portion 2 includes a large diameter portion 20 expanding radially outward. A portion of the first shaft portion 21 closer to the accumulator chamber 11 side than the large diameter portion 20 extends along the main inner surface 1A of the cylindrical cylinder portion 1. As shown in FIG. 2, a seal portion 5 such as an O-ring is provided between the first shaft portion 21 and the main inner surface 1A. The seal portion 5 is arranged at a position slightly away from the accumulator chamber 11 than the pressure receiving surface 2A. A recess for arranging the seal portion 5 in this manner is provided at an outer peripheral edge of the first shaft portion 21 on the accumulator chamber 11 side.

The large diameter portion 20 and a boundary portion 1D between the main inner surface 1A and the bore portion 1B of the cylindrical cylinder portion 1 abut against each other in the axial direction of the cylindrical cylinder portion 1. As a result, the large diameter portion 20 (as a result, the lid portion 2) is restricted from moving toward the accumulator chamber 11 from the boundary portion 1D.

An extending portion 22 having a smaller diameter than the large diameter portion 20 and expanding radially outward of the cylindrical cylinder portion 1 is provided on the large diameter portion 20 on an opposite side to the accumulator chamber 11. In this example, the extending portion 22 has a cylindrical shape. However, the shape of the extending portion 22 is not particularly limited, and may have another shape other than a cylinder. The extending portion 22 may be made up of a plurality of members. The extending portion 22 may be formed integrally with the large diameter portion 20 or may be formed separately from the large diameter portion 20. In this example, the large diameter portion 20 and the extending portion 22 are integrally formed.

The second shaft portion 23 of the lid portion 2 is arranged radially inward of the screwable portion 3. In this example, the second shaft portion 23 has a cylindrical shape. However, the shape of the second shat portion 23 is not particularly limited, and may have another shape other than a cylinder. The second shaft portion 23 may be made up of a plurality of members.

As shown in FIG. 2, the screwable portion 3 includes a through hole 31 in which the second shaft portion 23 is arranged. The screwable portion 3 has a recessed portion 32 recessed radially outward at an end portion on the accumulator chamber 11 side. The recessed portion 32 and the extending portion 22 abut against in the axial direction of the cylindrical cylinder portion 1. Further, an outer peripheral edge 3A of the screwable portion 3 on the accumulator chamber 11 side (that is, the portion in the vicinity of the screw-threaded portion 12) and the large diameter portion 20 are separated from each other in the axial direction of the cylindrical cylinder portion 1 with the recessed portion 32 kept in abutment against the extending portion 22 in this manner.

When the screwable portion 3 is screwed in a direction approaching the accumulator chamber 11 from the end portion of the cylindrical cylinder portion 1, the recessed portion 32 of the screwable portion 3 presses the extending portion 22 of the lid portion 2 toward the accumulator chamber 11. Accordingly, in a state in which the large diameter portion 20 is pressed against the boundary portion 1D of the cylindrical cylinder portion 1, a movement of the lid portion 2 in the axial direction is restricted. At this time, since the outer peripheral edge 3A of the screwable portion 3 is separated from the large diameter portion 20, the outer peripheral edge 3A does not directly press the lid portion 2. Conversely, in a case where high-pressure gas is stored in the accumulator chamber 11, the force exerted on the lid portion 2 by the gas in the accumulator chamber 11 is not directly transmitted to the outer peripheral edge 3A. As a result, the force exerted on the lid portion 2 by the gas in the accumulator chamber 11 is not easily transmitted to the screw-threaded portion 12, and a stress generated in the screw-threaded portion 12 can be reduced. Incidentally, a female thread may be formed on an inner surface of the through hole 31 of the screwable portion 3, a male thread may be formed on an outer peripheral surface of the second shaft portion 23 of the lid portion 2, so that the screwable portion 3 and the second shaft portion 23 are screw-threaded together.

In the axial direction of the cylindrical cylinder portion 1, the extending portion 22 preferably extends to a position away from the accumulator chamber 11 than two or more threads of a meshing engagement of the screw-threaded portion 12 between the female thread portion 1C and the male thread portion 30 on the accumulator chamber 11 side. In addition, a length of the extending portion 22 in the axial direction is preferably 54% or less than a length L in the axial direction between a position where the seal portion 5 is provided and the outer peripheral edge 3A of the screwable portion 3. When the extending portion 22 is too short, an effect of reducing the stress generated in the screw-threaded portion 12 cannot be sufficiently obtained. The effect increases as the extending portion 22 extends longer, and becomes saturated when the extending portion 22 reaches a predetermined length. Therefore, the length of the extending portion 22 may be set to an appropriate length enough to sufficiently exert the effect of reducing the stress generated in the screw-threaded portion 12.

An outer peripheral surface 22A of the extending portion 22 is preferably positioned away from an inner peripheral surface 31A of the through hole 31 of the screwable portion 3 toward the radially outer side by 45% to 80% of a radial thickness T2 of the screwable portion 3 including a radial height (thickness) of the male thread portion 30. However, when the outer peripheral surface 22A of the extending portion 22 is too close to the male thread portion 30 (for example, in a case where the outer peripheral surface 22A is at a position exceeding 80% of the thickness T2 from the inner peripheral surface 31A), the effect of reducing the stress generated in the screw-threaded portion 12 is reduced. In addition, when the outer peripheral surface 22A of the extending portion 22 is too far from the male thread portion 30 (for example, in a case where the outer peripheral surface 22A is positioned less than 45% of the thickness T2 from the inner peripheral surface 31A), the effect of reducing the stress generated in the screw-threaded portion 12 is also reduced.

When a thickness T3 of a ligament portion (that is, a portion positioned radially outward of the extending portion 22 including the male thread portion 30 of the screwable portion 3) is excessively small, there is a possibility that a problem such as deformation of the ligament portion occurs when a work piece is hit by mistake or the like. The thickness of the ligament portion is preferably 180% or more of a height of the screw thread (a distance between a crest and a root of the thread) in the screw-threaded portion 12, or is preferably 120% or more of a pitch of the thread in the screw-threaded portion 12.

An autofrettaging treatment may be applied to the main inner surface 1A of the cylindrical cylinder portion 1. When applying the autofrettaging treatment, an inner peripheral layer forming the main inner surface 1A of the cylindrical cylinder portion 1 is plastically deformed, so that a residual stress is generated in the inner peripheral layer.

Accordingly, strength of the main inner surface 1A is increased. On the other hand, when applying the autofrettaging treatment, an outer peripheral layer forming the outer peripheral surface 1F of the cylindrical cylinder portion 1 is more likely to be elastically deformed than the inner peripheral layer.

In the pressure vessel 10, the main inner surface 1A can be precisely machined by making the cylindrical cylinder portion 1 cylindrical. Therefore, for example, it is preferable to manufacture the cylindrical cylinder portion 1 so that a machining crack having a depth of 0.5 mm or greater does not occur on the main inner surface 1A. In addition, an internal inspection of the cylindrical cylinder portion 1 after manufacturing can also be carried out easily and accurately by removing the lid portion 2, the screwable portion 3, or the like. As a result, a quality of the pressure vessel 10 is further improved. After the internal inspection is finished, the lid portions 2, the screwable portion 3, or the like can be easily attached to the cylindrical cylinder portion 1.

As described above, in the pressure vessel 10 of the present embodiment, the force exerted on the lid portion 2 by the gas in the accumulator chamber 11 is not directly transmitted from the large diameter portion 20 to the outer peripheral edge 3A of the screwable portion 3.

As a result, the force caused by the gas in the accumulator chamber 11 is not concentrated in a portion (that is, a first screw thread 12A and the vicinity thereof) of the screw-threaded portion 12 on the accumulator chamber 11 side, and the force can be distributed over a wider range of the screw-threaded portion 12.

In the present embodiment, the reinforcing ring 4 is fitted to the outer peripheral surface 1F of each of both the end portions of the cylindrical cylinder portion 1. The reinforcing ring 4 preferably has a thickness of 5% or more and 10% or less of an outer diameter of the cylindrical cylinder portion 1. As will be described later, according to experiments and considerations made by the inventors, it becomes clear that the reinforcing ring 4 having such a thickness can achieve both effects of protecting the seal portion 5 and the screw-threaded portion 12 and an economic efficiency and weight of the pressure vessel 10 as a product.

The reinforcing ring 4 can be fixed to the outer peripheral surface 1F of the cylindrical cylinder portion 1 by shrink fitting, for example. However, a method of attaching the reinforcing ring 4 to the cylindrical cylinder portion 1 is not particularly limited. For example, the reinforcing ring 4 may be divided into a plurality of pans, these divided parts may be attached to the outer peripheral surface 1F of the cylindrical cylinder portion 1, and the parts may be joined together by welding or the like. In addition, the reinforcing ring 4 is preferably fitted to the cylindrical cylinder portion 1 in a state of exerting a compressive stress so as to tighten the cylindrical cylinder portion 1. For example, the tightening can be realized by the shrink fitting. Since the reinforcing ring 4 exerts the compressive stress on the cylindrical cylinder portion 1, an effect of protecting the seal portion 5 and the screw-threaded portion 12 can be further enhanced.

In the present embodiment, both end portions of the cylindrical cylinder portion 1 are opened, and the reinforcing rings 4 are attached to both end portions. However, in a case where only one end portion of the cylindrical cylinder portion 1 is opened, the reinforcing ring 4 only needs to be fitted to the opened end portion. The reinforcing ring 4 is preferably arranged on the outer peripheral surface 1F of the cylindrical cylinder portion 1 so as to be at a position corresponding to a part or the whole of the screw-threaded portion 12. However, the position of the reinforcing ring 4 preferably includes a position corresponding to the portion of the screw-threaded portion 12 on the accumulator chamber 11 side (that is, the first screw thread 12A and the vicinity thereof), and more preferably includes a position corresponding to the whole of screw-threaded portion 12.

The reinforcing ring 4 is preferably arranged on the outer peripheral surface 1F of the cylindrical cylinder portion 1 so as to be at a position corresponding to the seal portion 5. By reinforcing the vicinity of a portion of the cylindrical cylinder portion 1 corresponding to the seal portion 5 with the reinforcing ring 4, a sealing performance of the seal portion 5 is enhanced. In a case where a distance from the seal portion 5 to the screw-threaded portion 12 is L, an end portion 4A of the reinforcing ring 4 on the accumulator chamber 11 side preferably extends a position corresponding to a portion separated by 0.35 L from the seal portion 5 to the accumulator chamber 11 side from a viewpoint of enhancing the sealing performance (see also FIG. 5(b)).

The reinforcing ring 4 preferably extends to a position corresponding to an end portion (that is, a screw thread 12B in FIG. 2) of the screw-threaded portion 12 on the opposite side to the accumulator chamber 11. As described above, by covering the position corresponding to the end portion (the screw thread 12B) of the screw-threaded portion 12 on the opposite side to the accumulator chamber 11 with the reinforcing ring 4, the effect of protecting the screw-threaded portion 12 is enhanced. In the case where the distance from the seal portion 5 to the screw-threaded portion 12 is L, an end portion 4B of the reinforcing ring 4 on the opposite side to the accumulator chamber 11 preferably extends to a position corresponding to a portion separated by 2.8 L from the seal portion 5 to the opposite side to the accumulator chamber 11 from a viewpoint of protecting the screw-threaded portion 12 (see also FIG. 5(b)).

The pressure vessel 10 of the present embodiment can be used as a hydrogen storage vessel at a hydrogen station so as to supply hydrogen to a motor vehicle equipped with a fuel cell using hydrogen as fuel. For example, the pressure vessel 10 can be used to supply hydrogen with a pressure of about 70 MPa to the motor vehicle equipped with the fuel cell. In this case, as an example, the pressure vessel 10 is subjected to repetition of pressure increase and pressure decrease of 400,000 times for 15 years. The pressure vessel 10 is light in weight and has a small number of parts while having sufficient strength to withstand such severe applications. In addition, the pressure vessel 10 is also excellent in safety and reliability required for the hydrogen station installed in an urban area or the like.

<Evaluation>

Figure 3:
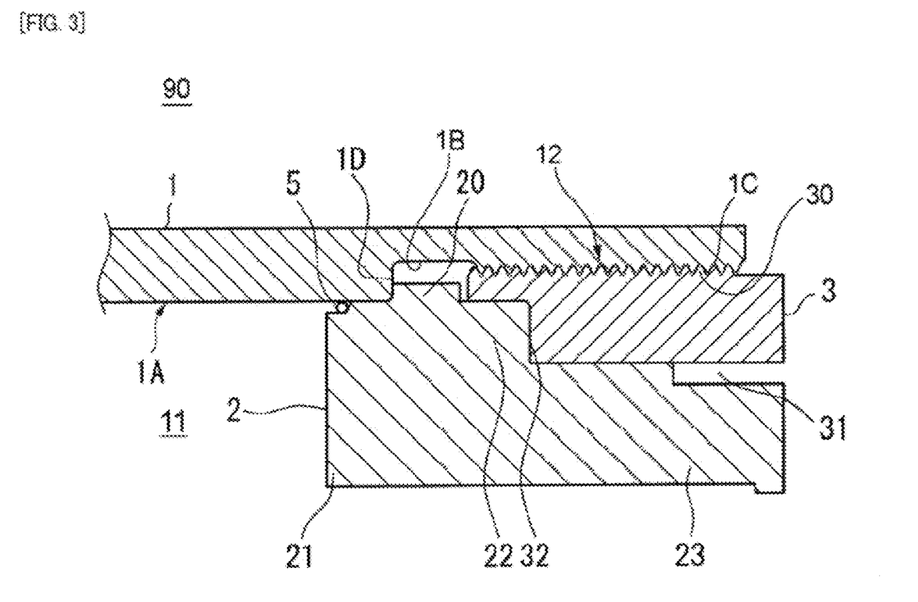
FIG. 3 is a sectional view showing a part of a pressure vessel according to a comparative example.

A test was conducted to compare the effects of the pressure vessel 10 of the present embodiment and a pressure vessel 90 as a comparative example without using the reinforcing ring 4. A sectional view of the pressure vessel 90 without using the reinforcing ring 4 is shown in FIG. 3. The pressure vessel 90 has the same configuration as that of the pressure vessel 10 of the above-described embodiment (for example, see FIG. 2), except that the reinforcing ring 4 is not included. Therefore, the description of each member included in the pressure vessel 90 will be omitted.

The cylindrical cylinder portion 1 of the pressure vessel 90 of the comparative example is formed of a thin-walled pipe (an inner diameter 4 is 290 mm, an outer diameter q is 376 mm). The cylindrical cylinder portion 1 has a shape corresponding to "fatigue crack propagation analysis according to Standard for Ultra High-Pressure Gas Equipment KHKS 0220 (2010) defined by the High Pressure Gas Safety Institute of Japan" (see NPL 4). In a case of using this thin-walled pipe, when the pressure vessel 90 is used within a stress range shown in Table 1 below, a safety coefficient is 2.4. Incidentally, in this case, the safety coefficient is a value calculated by "tensile strength of a steel material forming the thin-walled pipe and/or the maximum stress generated in the thin-walled pipe".

In a case where an internal pressure of the pressure vessel 90 of the comparative example was repeatedly varied between 50 MPa and 82 MPa, values of stresses (specifically, a primary principal stress) generated in the screw threads of the screw-threaded portion 12 were estimated by a computer simulation. The results of the estimation are shown in Table 1 below. Incidentally, the "stress range" in Table 1 is a difference between the maximum value and the minimum value of the stress generated in each screw thread. As shown in Table 1, in the pressure vessel 90 of the comparative example, the maximum stress generated in the first screw thread 12A of the cylindrical cylinder portion 1 is 842 MPa. The value of the maximum stress greatly exceeds a yield stress (generally 785 MPa) of high-strength steels. In addition, the stress range of the first screw thread 12A is 329 MPa and exceeds 300 MPa, which is a criterion for ensuring a fatigue life.

The fatigue crack propagation analysis according to the above-described standard was performed assuming an annular crack having a depth of 0.1 mm at the screw-threaded portion 12 of the cylindrical cylinder portion 1 as an initial assumed crack. The presence or absence of the crack was verified by penetrant inspection or magnetic particle inspection. As a result, in the case where the pressure was repeatedly varied between 82 MPa and 50 MPa, as shown in Table 2 below and a graph of FIG. 4, a fatigue crack propagation life Na1 of the pressure vessel 90 of the comparative example was 74,000 times. The fatigue crack propagation life is synonymous with the allowable number of cycles, and is ½ of the number of cycles N at which the fatigue crack penetrates through the cylindrical cylinder portion 1. The fatigue crack propagation life Na1 of the pressure vessel 90 of the comparative example is significantly less than 400,000 times required as the hydrogen storage vessel for the hydrogen station. Therefore, in the pressure vessel 90 of the comparative example, the fatigue crack propagation life is insufficient as this type of hydrogen storage vessel.

TABLE 1

| Comparative example | Cylindrical cylinder portion | | | Serewable portion | | |
|---|---|---|---|---|---|---|
| | Internal pressure [MPa] | | | Internal pressure [MPa] | | |
| Screw thread position | 82 Primary principal stress [MPa] | 52 Primary principal stress [MPa] | Stress range [MPa] | 82 Primary principal stress [MPa] | 52 Primary principal stress [MPa] | Stress range [MPa] |
| 0 | 573 | 349 | 224 | | | |
| 1 | 842 | 513 | 329 | 317 | 193 | 124 |
| 2 | 715 | 436 | 279 | 323 | 197 | 126 |
| 3 | 623 | 380 | 243 | 324 | 198 | 126 |
| 4 | 551 | 336 | 215 | 336 | 205 | 131 |
| 5 | 510 | 311 | 199 | 404 | 246 | 158 |
| 6 | 483 | 295 | 188 | 429 | 262 | 167 |
| 7 | 436 | 266 | 170 | 409 | 249 | 160 |

TABLE 2

| Safety coefficient | Evaluated portion | Fatigue crack preparation life 50 to 82 MPa |
|---|---|---|
| 2.4 | Screw-threaded portion | 74,000 |

In contrast, the pressure vessel 10 of the present embodiment has a structure in which the reinforcing ring 4 is attached to the cylindrical cylinder portion 1 as shown in FIGS. 1 and 2. In this example, the reinforcing ring 4 made of chrome molybdenum steel material SCM35 was used. A length of the reinforcing ring 4 in the axial direction of the cylindrical cylinder portion 1 is 400 mm. The thickness of the reinforcing ring 4 in the radial direction of the cylindrical cylinder portion 1 is 25 mm. As shown in FIG. 5(b), in the case where the distance from the seal portion 5 to the screw-threaded portion 12 is L, the end portion 4A of the reinforcing ring 4 on the accumulator chamber 11 side extends to a position corresponding to a portion separated by 0.64 L from the seal portion 5 to the accumulator chamber 11 side. The end portion 4B of the reinforcing ring 4 on the opposite side to the accumulator chamber 11 extends to a position corresponding to the end portion of the screw-threaded portion 12 (that is, an end portion 1E of the cylindrical cylinder portion 1). Incidentally, a friction coefficient between the cylindrical cylinder portion 1 and the reinforcing ring 4 is 0.3.

Figure 4:
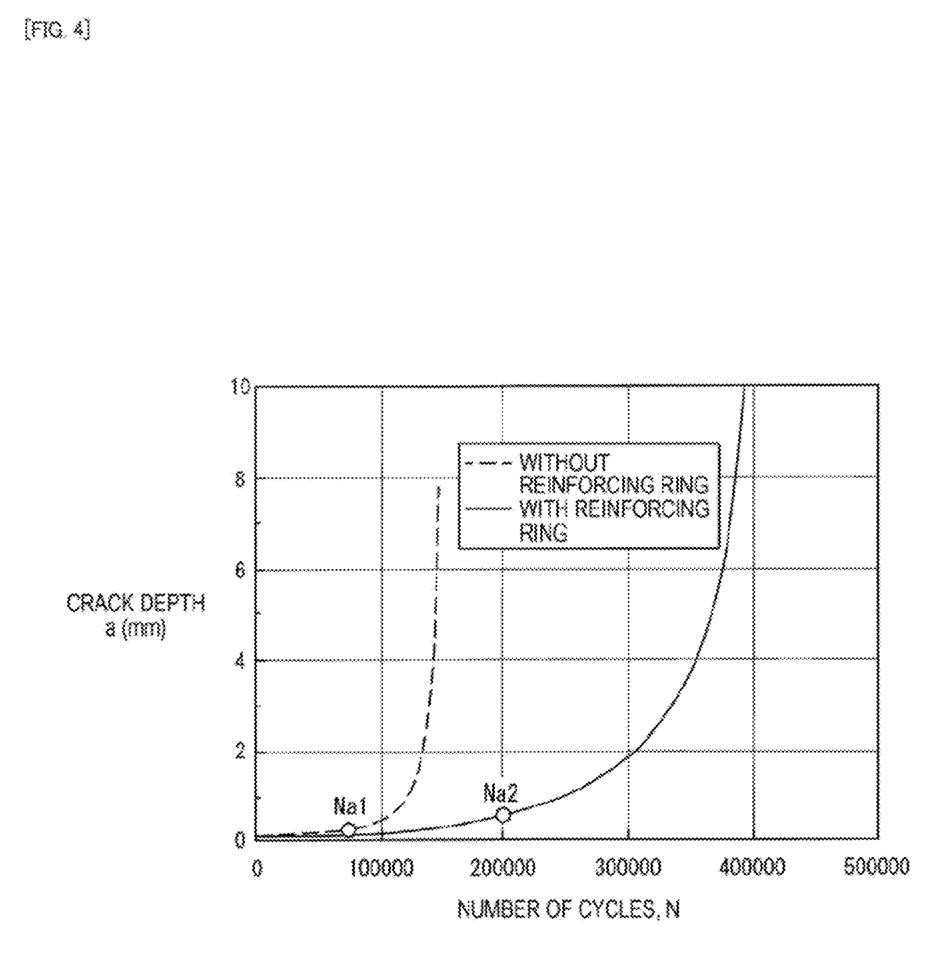
FIG. 4 is a graph showing a relationship between a presence or absence of a reinforcing ring and a development or propagation of a crack depth.

The fatigue crack propagation analysis similar to that of the pressure vessel 90 of the comparative example was performed on the pressure vessel 10 prepared as described above. As a result, as shown in the graph of FIG. 4, a fatigue crack propagation life Na2 was improved up to 200,000 times. As described above, it became clear that the effect of improving the fatigue crack propagation life can be obtained by using the reinforcing ring 4.

Next, a relationship between the stress range in the screw-threaded portion 12 and the length and arrangement of the reinforcing ring 4 was studied.

Figure 5A:
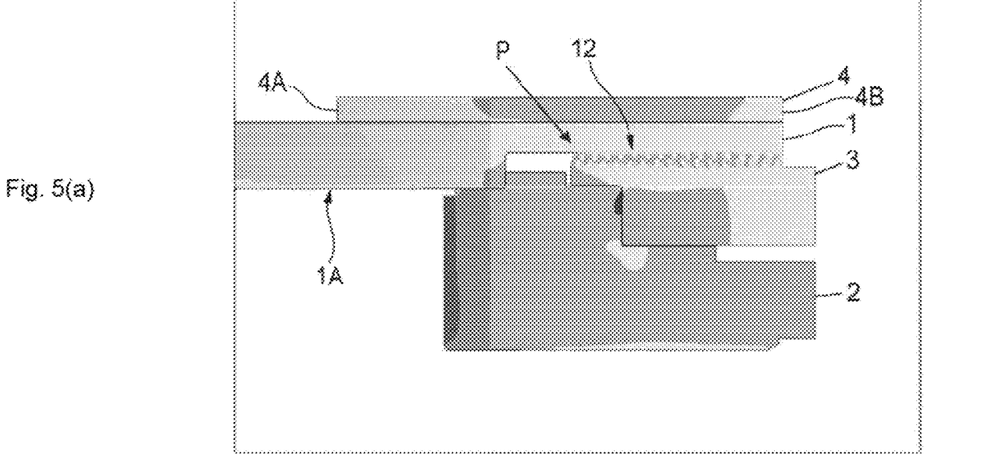
FIG. 5(a) is a view for explaining stress distributions in the pressure vessel according to the embodiment.
Figure 5B:
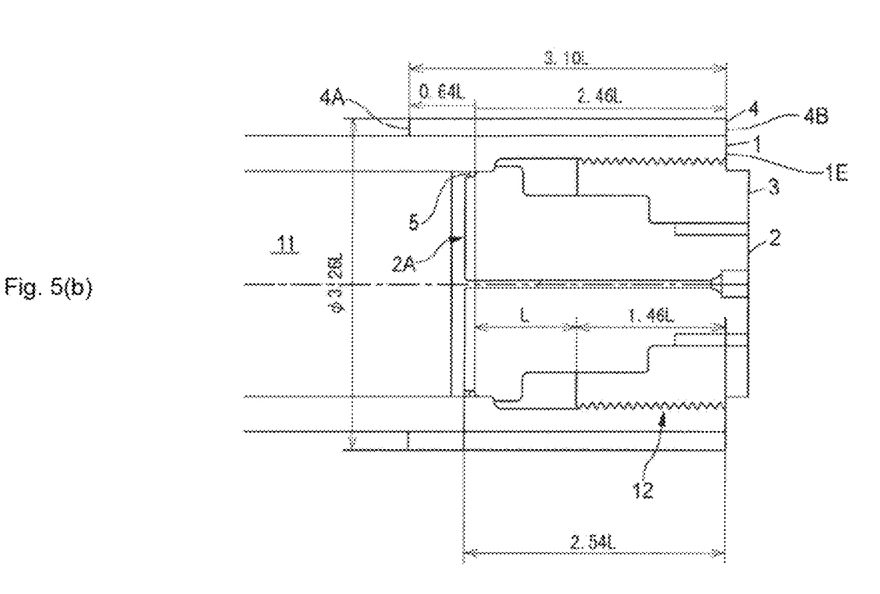
FIG. 5(b) is a view for explaining dimensions of the pressure vessel according to the embodiment.

FIG. 5(a) is a view showing distribution of the stress (specifically, the primary principal stress) generated in the pressure vessel 10 estimated by the computer simulation in a case of varying the internal pressure of the pressure vessel 10 configured to have various dimensions shown in FIG. 5(b) between 50 MPa and 82 MPa. In this example, a stress generated at a point P shown in FIG. 5(a) (in the vicinity of the root of the zeroth thread of the cylindrical cylinder portion 1) was maximized. As shown in FIG. 5(b), when a distance from a position of the seal portion 5 to the screw-threaded portion 12 is a reference distance L, a length from the pressure receiving surface 2A to the end portion 4B of the screw-threaded portion 12 on the opposite side to the accumulator chamber 11 is 2.54 L, a length from the seal portion 5 to the end portion 4B of the screw-threaded portion 12 is 2.46 L, the length of the screw-threaded portion 12 is 1.46 L, the outer diameter of the reinforcing ring 4 is 3.26 L, and the length of the reinforcing ring 4 is 3.10 L.

Figure 6A:
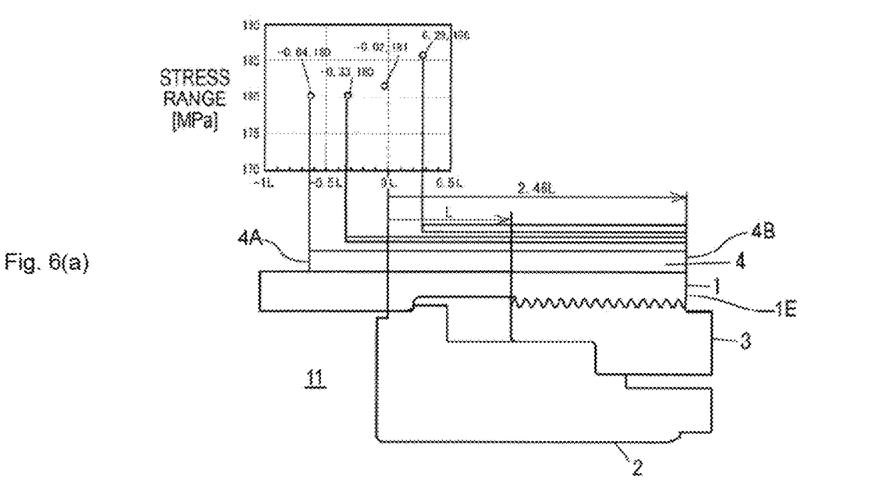
FIGS. 6(a) and 6(b) are views showing a relationship between a position of an end portion of the reinforcing ring on an accumulator chamber side and a stress generated in a screw-threaded portion.
Figure 6B:
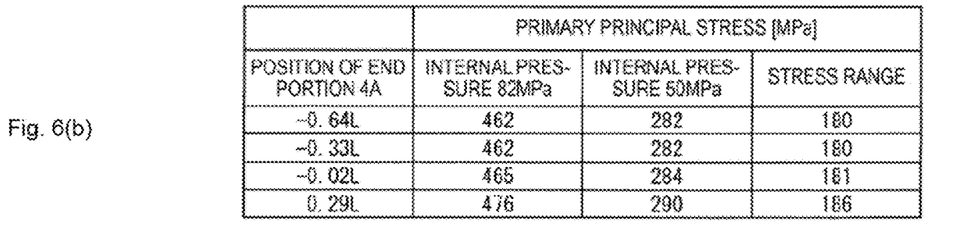

FIGS. 6(a) and 6(b) show values of the stress at the point P in FIG. 5(a) in the case of varying the length of the reinforcing ring 4 (specifically, the position of the end portion 4A) in a state of aligning the end portion 1E of the cylindrical cylinder portion 1 with the end portion 4B of the reinforcing ring 4. As shown in a table of FIG. 6(b), it became clear that the stress range was reduced when the length of the reinforcing ring 4 on the accumulator chamber 11 side was increased. Specifically, the value of the stress range is reduced to 180 MPa, and is much smaller than the value (329 MPa) in the case where the reinforcing ring 4 shown in Table 1 is not provided. Therefore, it became clear that the fatigue crack propagation life could be further improved by setting the length of the reinforcing ring 4 as shown in FIGS. 6(a) and 6(b). However, even if the position of the end portion 4A of the reinforcing ring 4 on the accumulator chamber 11 side is changed from a position corresponding to −0.33 L to a position corresponding to −0.64 L, the value of the stress range does not substantially change. Therefore, the optimum length of the reinforcing ring 4 is so considered that a distance from the position corresponding to the seal portion 5 to the position of the end portion 4A of the reinforcing ring 4 is about −0.35 L.

Figure 7A:
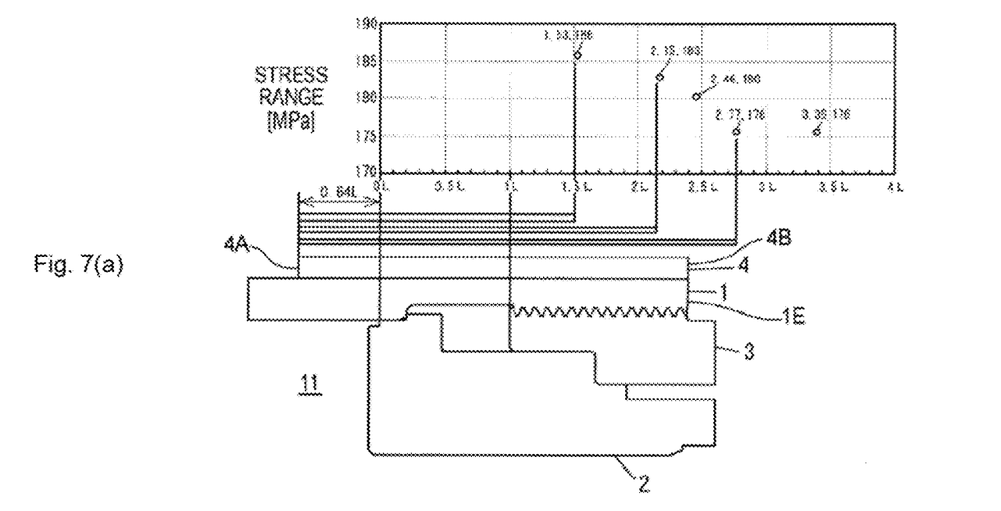
FIGS. 7(a) and 7(b) am views showing a relationship between a position of an end portion of the reinforcing ring on an opposite side to the accumulator chamber and the stress generated in the screw-threaded portion.
Figure 7B:
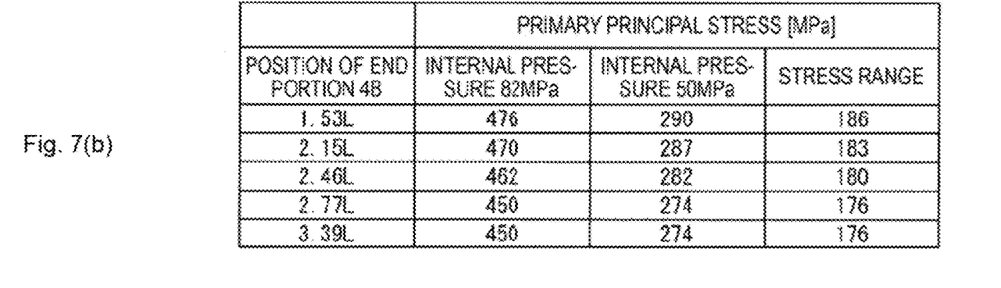

FIGS. 7(a) and 7(b) show values of the stress at the point P in FIG. 5(a) in the case of varying a position of the end portion 4B of the reinforcing ring 4 in a state of setting the position of the end portion 4A of the reinforcing ring 4 to −0.64 L. It became clear that the stress range was reduced as the position of the end portion 4B of the reinforcing ring 4 approached the end portion 1E of the cylindrical cylinder portion 1, and after the position of the end portion 4B exceeded the end portion 1E, the stress range was further reduced until the position of the end portion 4B reached 2.77 L. Therefore, it became clear that a reinforcing effect of the screw-threaded portion 12 was improved by slightly protruding the end portion 4B of the reinforcing ring 4 from the end portion 1E of the cylindrical cylinder portion 1 in an opposite direction from the accumulator chamber 11. However, even if the position of the end portion 4B of the reinforcing ring 4 is changed from a position corresponding to 2.77 L to a position corresponding to 3.39 L, the value of the stress range does not substantially change. Therefore, it is considered that the optimum length of the reinforcing ring 4 from the position corresponding to the seal portion 5 to the position of the end portion 4B of the reinforcing ring 4 is about 2.8 L.

In a case where the positions of the end portions 4A, 4B of the reinforcing ring 4 were set to the optimum values (that is, the end portion 4A: −0.35 L, the end portion 4B: 2.8 L), when the fatigue crack propagation analysis similar to that of the pressure vessel 90 of the comparative example was performed, the fatigue crack propagation life of the pressure vessel 10 was 680,000 times (not shown in the graph of FIG. 4). Therefore, the fatigue crack propagation life was significantly improved as compared with 74,000 times in the pressure vessel 90 of the comparative example shown in Table 1. Further, the fatigue crack propagation life is sufficiently higher than 400,000 times, which is the number of times of use assumed as a hydrogen storage vessel for the hydrogen station.

As described above, it became clear that the fatigue crack propagation life of the cylindrical cylinder portion 1 can be remarkably improved by appropriately determining the positions of both end portions 4A, 4B of the reinforcing ring 4.

The present invention is not limited to the above-described embodiment, and various modifications can be adopted within the scope of the present invention. For example, the present invention is not limited to the embodiments described above, and be appropriately modified, improved or the like. Additionally, materials, shapes, sizes, numbers, arrangement positions, or the like of constituent elements in the above-described embodiment are optional and are not limited as long as the present invention can be achieved.

The present application is based on a Japanese Patent Application (Japanese Patent Application No. 2017-208590) filed on Oct. 27, 2017, the contents of which are incorporated herein by reference.

INDUSTRIAL APPLICABILITY

The pressure vessel according to the present invention can suppress both hydrogen environment embrittlement of the screwable portion in the case of storing hydrogen in the accumulator chamber and fatigue crack of the screwable portion due to the internal pressure of the accumulator chamber. The pressure vessel according to the present invention having these effects can be used, for example, in the hydrogen storage vessel at the hydrogen station.

REFERENCE SIGNS LIST 1 cylindrical cylinder portion
1A main inner surface
1B bore portion
1C female thread portion
1D boundary portion
2 lid portion
2A pressure receiving surface
3 screwable portion
4 reinforcing ring
5 seal portion
10 pressure vessel
11 accumulator chamber
12 screw-threaded portion
20 large diameter portion
22 extending portion
23 second shaft portion
30 male thread portion
31 through hole
32 recessed portion

The invention claimed is:
1. A pressure vessel comprising:
a cylinder portion defining an accumulator chamber therein;
a screwable portion arranged inside of both end portions of the cylinder portion in an axial direction of the cylinder portion, an outer peripheral portion of the screwable portion being screw-threaded into an inner peripheral portion of the cylinder portion;
a lid portion arranged at a position closer to the accumulator chamber than the screwable portion and comprising a pressure receiving surface facing the accumulator chamber; and
a reinforcing ring fitted to an outer peripheral surface of the cylinder portion at each of the both end portions of the cylinder portion, the reinforcing ring covering a portion of the outer peripheral surface corresponding to an entirety of a screw-threaded portion of the cylinder portion and the screwable portion along the axial direction of the cylinder portion.
2. The pressure vessel according to claim 1, further comprising:
a seal portion sealing a gap between the lid portion and the cylinder portion,
wherein the reinforcing ring is configured such that an end portion of the reinforcing ring on an accumulator chamber side in the axial direction is positioned at a position on the outer peripheral surface corresponding to the seal portion, or at a position closer to the accumulator chamber side in the axial direction than the position on the outer peripheral surface corresponding to the seal portion.

3. The pressure vessel according to claim 1,
wherein the reinforcing ring is configured such that an end portion of the reinforcing ring on an opposite side to the accumulator chamber in the axial direction is positioned at a position on the outer peripheral surface corresponding to an end portion of the screw-threaded portion on an opposite side to the accumulator chamber, or at a position farther away from the accumulator chamber in the axial direction than the position on the outer peripheral surface corresponding to the end portion of the screw-threaded portion on the opposite side to the accumulator chamber.

4. The pressure vessel according to claim 1,
wherein a difference between the maximum value and the minimum value of a stress generated in the screw-threaded portion is 300 MPa or less in a case where a pressure in the accumulator chamber varies in a range between 50 MPa to 82 MPa.

5. The pressure vessel according to claim 1,
wherein the reinforcing ring is fitted to the cylinder portion in a state of exerting a compressive stress so as to tighten the cylinder portion.

6. The pressure vessel according to claim 1,
wherein a thickness of the reinforcing ring in a radial direction of the cylinder portion is between 5% to 10% of an outer diameter of the cylinder portion.

7. The pressure vessel according to claim 1,
wherein the lid portion comprises an extending portion expanding radially outward of the cylinder portion,
wherein the screwable portion comprises a recessed portion recessed radially outward,
wherein the extending portion and the recessed portion abut against each other in the axial direction, and
wherein an outer peripheral edge of the screwable portion on an accumulator chamber side and the lid portion are separated from each other in the axial direction.

8. The pressure vessel according to claim 1,
wherein the cylinder portion has a straight tubular and cylindrical shape.

9. The pressure vessel according to claim 1,
wherein a fatigue crack life is not less than 400,000 times in a case where an annular crack having a depth of 0.1 mm is assumed as an initial assumed crack in the screw-threaded portion of the cylinder portion, in fatigue crack propagation analysis according to Standard for Ultra High-Pressure Gas Equipment KHKS 0220 (2010) defined by the High Pressure Gas Safety Institute of Japan.

10. The pressure vessel according to claim 1,
wherein an end portion of the reinforcing ring on an accumulator chamber side extends to a position corresponding to a portion separated by a predetermined distance from the seal portion to the accumulator chamber side, so that the reinforcing ring covers the portion of the outer peripheral surface corresponding to the whole of the screw-threaded portion of the cylinder portion and the screwable portion along the axial direction of the cylinder portion.

11. The pressure vessel according to claim 1,
wherein the reinforcing ring is made of metal.

12. A pressure vessel comprising,
a cylinder portion defining an accumulator chamber therein;
a screwable portion arranged inside at least one of both end portions of the cylinder portion, an outer peripheral portion of the screwable portion being screw-threaded into an inner peripheral portion of the cylinder portion;
a lid portion arranged at a position closer to the accumulator chamber than the screwable portion and comprising a pressure receiving surface facing the accumulator chamber;
a reinforcing ring fitted to an outer peripheral surface of the cylinder portion, the reinforcing ring covering a portion of the outer peripheral surface corresponding to an entirety of a screw-threaded portion of the cylinder portion and the screwable portion along an axial direction of the cylinder portion; and
a seal portion sealing a gap between the lid portion and the cylinder portion,
wherein the reinforcing ring is configured such that the end portion of the reinforcing ring on the accumulator chamber side in the axial direction is positioned at a position closer to the accumulator chamber side in the axial direction than a position on the outer peripheral surface corresponding to the seal portion.

13. The pressure vessel according to claim 12,
wherein the reinforcing ring is configured such that an end portion of the reinforcing ring on an opposite side to the accumulator chamber in the axial direction is positioned at a position farther away from the accumulator chamber in the axial direction than the position on the outer peripheral surface corresponding to the end portion of the screw-threaded portion on the opposite side to the accumulator chamber.

* * * * *